US006456858B1

(12) United States Patent
Streter

(10) Patent No.: US 6,456,858 B1
(45) Date of Patent: Sep. 24, 2002

(54) SYSTEM AND METHODS IN A DUAL MODE WIRELESS SYSTEM FOR TRANSMITTING RESCAN COMMAND BASED ON DETECTED NETWORK CONDITIONS

(75) Inventor: Cory W. Streter, Ewing, NJ (US)

(73) Assignee: Verizon Wireless, Bedminster, NJ (US)

( * ) Notice: Subject to any disclaimer, the term of this patent is extended or adjusted under 35 U.S.C. 154(b) by 0 days.

(21) Appl. No.: 09/215,787

(22) Filed: Dec. 21, 1998

(51) Int. Cl.[7] .................................................. H04Q 7/20
(52) U.S. Cl. ........................ 455/552; 455/439; 455/552; 455/553; 370/229; 370/331; 370/332; 370/333
(58) Field of Search ................................ 455/439, 452, 455/553; 370/229

(56) References Cited

U.S. PATENT DOCUMENTS

| | | | | |
|---|---|---|---|---|
| 4,573,206 A | * | 2/1986 | Grauel et al. | 455/33 |
| 4,670,899 A | * | 6/1987 | Brody et al. | 379/60 |
| 5,228,074 A | * | 7/1993 | Mizikovsky | 379/59 |
| 5,257,401 A | * | 10/1993 | Dahlin et al. | 455/33.2 |
| 5,335,355 A | * | 8/1994 | Tanaka et al. | 455/33.1 |
| 5,594,718 A | * | 1/1997 | Weaver, Jr. et al. | 370/331 |
| 5,642,378 A | * | 6/1997 | Denheyer et al. | 375/216 |
| 5,697,055 A | * | 12/1997 | Gilhousen et al. | 455/33.2 |
| 5,754,542 A | * | 5/1998 | Ault et al. | 370/342 |
| 5,835,564 A | * | 11/1998 | Chang et al. | 379/1 |
| 5,870,674 A | * | 2/1999 | English | 455/432 |
| 5,898,681 A | * | 4/1999 | Dutta | 370/229 |
| 5,983,102 A | * | 11/1999 | Gozes | 455/432 |
| 5,995,829 A | * | 11/1999 | Broderick | 455/418 |
| 6,035,197 A | * | 3/2000 | Haberman et al. | 12/94 |
| 6,069,871 A | * | 5/2000 | Sharma et al. | 370/209 |
| 6,304,755 B1 | * | 10/2000 | Tiedemann, Jr. et al. | 455/437 |
| 6,169,898 B1 | * | 10/2001 | Hsu et al. | 455/432 |
| 6,320,855 B1 | * | 11/2001 | Shi | 370/332 |
| 6,321,097 B1 | * | 11/2001 | Kim | 455/553 |
| 6,324,403 B1 | * | 11/2001 | Jalloul | 455/453 |

* cited by examiner

Primary Examiner—Thanh Cong Le
Assistant Examiner—Stephen D'Agosta
(74) Attorney, Agent, or Firm—McDermott, Will & Emery

(57) ABSTRACT

A dual-mode wireless telephone communications system, having a digital wireless communications system (e.g., CDMA) and a second wireless communications system, selectively outputs a rescan command from the digital wireless system to at least one selected dual-mode wireless telephone. The digital wireless communications system outputs the rescan command based on a detected traffic condition in the digital wireless system. The rescan command, output to the selected dual-mode wireless telephone via a digital wireless signaling channel, instructs the selected dual-mode wireless telephone to register with an alternative wireless communications system (e.g., AMPS) when the dual-mode wireless telephone is in an idle state. Hence, the digital wireless system can selectively limit access to the CDMA system by dual-mode telephones using proactive rescan commands that avoid the necessity of hard handoff or call transfer procedures normally encountered when initiating a wireless telephone call on the digital wireless communications system.

27 Claims, 4 Drawing Sheets

SYSTEM AND METHODS IN A DUAL MODE WIRELESS SYSTEM FOR TRANSMITTING RESCAN COMMAND BASED ON DETECTED NETWORK CONDITIONS

BACKGROUND OF THE INVENTION

1. Field of the Invention

The present invention relates to wireless networks, more specifically to dual-mode wireless telephone communication networks that overlay digital cellular systems over existing analog-based cellular systems.

2. Background Art

Wireless telephone communication systems have evolved from the Advanced Mobile Phone Service (AMPS) technology, introduced around 1983, to more sophisticated digital-based air interface protocols. Specifically, the AMPS technology is an analog-based technology that uses frequency division multiple access techniques to divide the available radio spectrum into channel bandwidths, where each 30 kilohertz voice channel supports a single conversation. The AMPS system includes a plurality of base stations transmitting voice channels within the 800 MHz cellular band into overlapping propagation regions, also referred to as cells, to establish a cellular-based coverage area.

Digital access technologies have been developed based on Time Division Multiple Access (TDMA) or Code Division Multiple Access (CDMA) schemes. These digital access technologies are more efficient relative to analog-based access technologies such as AMPS. In TDMA, the RF carrier is divided into time slots. The digital system allocates speech to these time slots by converting and compressing speech information carried by analog voice signals into compressed digital samples using vocoding techniques, enabling the speech samples to fit into the time slots. Hence, 3 or more time slots may fit into each 30 kHz channel, resulting in at least a three-fold increase in capacity. The well-recognized TDMA-based GSM standard utilizes 8 time slots in 200 kHz bandwidth channels.

Code Division Multiple Access (CDMA) is an even more efficient access technology, where the compressed speech samples are spread over a large frequency band by coding each speech sample with a unique pseudorandom sequence. Multiple voice samples can then be sent through the same wide-frequency band. The digital wireless telephone having the correct pseudorandom sequence will reproduce the corresponding speech sample, whereas voice samples transmitted with different pseudorandom sequences will appear as background noise in the frequency band.

Hence, digital access technologies have substantial advantages over analog-based systems. Digital cellular systems, however, have not yet been deployed in as many regions as AMPS-based systems. Hence, digital cellular subscribers are offered continuous coverage using dual-mode wireless telephones capable of switching between a first mode (e.g., CDMA) and a second mode (e.g., AMPS) based on the availability of a certain technology.

Current dual-mode digital telephones are configured for initially searching for the preferred and digital technology, such as CDMA. Hence, the dual-mode wireless telephones will connect to an alternative technology (e.g., AMPS) only if the dual-mode digital telephone is unable to establish a link with the preferred digital (e.g., CDMA) technology. Hence, the dual-mode telephone will always try to look for the preferred CDMA technology first.

One problem encountered in digital cellular systems is that the digital wireless communication system may encounter a traffic condition that results in a system overload in the digital wireless communication system. For example, the number of CDMA telephone users may exceed a certain number that results in an unacceptably high level of system noise in the common air interface, also referred to as the airlink interface. Alternatively, atmospheric conditions may cause interference overload of the airlink. Alternatively, a hardware failure in a base station or within the switching matrix of the digital wireless communication system may reduce the capacity of the digital wireless communication system, resulting in system blockage on the digital wireless communication system.

One possible solution to overcoming the blockage problem in the digital wireless communication system is to transfer an existing telephone call by a dual-mode telephone from the CDMA-based system to the alternative AMPS-based system using a hard handoff protocol. The hard handoff from the CDMA-based system within the dual-mode system to the AMPS-based system is one of the most complicated and signaling-intensive procedures in wireless networks, especially since the dual-mode wireless telephone must switch from the digital mode to analog mode simultaneously with the hard handoff. Hence the hard handoff from the CDMA system to the AMPS system has a substantial risk in dropping the call.

In addition, attempts to transfer a CDMA-based wireless telephone call initiated by dual-mode telephone to an analog system requires the dual-mode telephone and the analog-based AMPS system to effectively reinitiate the telephone call before the calls go through, resulting in a substantially long time for call completion when a dual-mode wireless telephone user places a call.

SUMMARY OF THE INVENTION

There is a need for an arrangement that minimizes the occurrence of a dropped call and minimizes call setup time by a dual-mode telephone in a dual-mode digital cellular system encountering traffic or overload conditions.

There is also a need for an arrangement that enables a dual-mode telephone system to redirect dual-mode telephones to access an alternative wireless telephone system based on detected traffic conditions in the digital wireless communication system.

These and other needs are attained by the present invention, where a dual-mode wireless communications system, having a digital wireless communications system and a second wireless communications system, selectively outputs a control command from the digital wireless communications system to at least one selected dual-mode wireless telephone based on a detected traffic condition in the digital wireless communication system. The control command, output to a selected dual-mode wireless mode telephone having registered with the digital wireless communication system, instructs the selected dual-mode wireless telephone to register with the second wireless communication system, for example when the dual-mode wireless telephone is in an idle state. Hence, the digital wireless communication system can selectively limit access by the dual-mode digital telephones by outputting a control command to selected dual-mode telephones to register with the second wireless communication system. Consequently, dual-mode telephones can be proactively configured to access the alternative wireless communication system during detected traffic conditions in the digital wireless communication system, avoiding any handoff or registration steps that normally would be encountered upon initiating a wireless telephone call on the digital wireless communication system.

According to one aspect of the present invention, a method is provided in a dual-mode wireless communication system having a digital wireless communication system overlying a second wireless communication system. The method includes detecting a prescribed traffic condition in the digital wireless communication system, and outputting a control command based on the detected traffic condition. The control command is output from the digital wireless communication system to at least one selected dual-mode wireless telephone that has registered with the digital wireless communication system. The control command instructs the dual-mode wireless telephone to register with the second wireless communication system. Hence, a dual-mode telephone can be proactively controlled to search for an alternate system based on the digital wireless communication system detecting a prescribed traffic condition.

Use of the control command enables the digital wireless communication system to redirect the selected dual-mode wireless telephone to register with the alternative wireless communication system while in an idle state (i.e., when a call is not is progress). Hence, dual-mode wireless telephones can be easily transferred to alternative wireless communication systems without the necessity of a hard handoff procedure, or a reinitiation to the other system during call set up by the dual-mode wireless telephone on the digital wireless communications system.

Another aspect of the present invention provides a method in a wireless communication system including at least one dual-mode wireless telephone and a dual-mode communication system. The dual-mode communication system has a first wireless communication system and a digital wireless communication system overlying the first wireless communication system. The method includes establishing a first wireless link between the dual-mode wireless telephone and the digital wireless communications system according to a prescribed digital wireless protocol. A prescribed traffic condition is detected in the digital wireless communication system, and a control command is transmitted to the dual-mode wireless telephone on the first wireless link based on the detected prescribed traffic condition. The dual-mode wireless telephone, in response to reception of the control command, establishes a second wireless link with the first wireless communication system during an idle telephone state and according to a prescribed wireless protocol and drops the first wireless link. The detection of a prescribed traffic condition in the digital wireless communication system enables the proactive generation of the control command before an actual overload condition is encountered on the digital wireless communication system. In addition, the establishment of a second wireless link by the dual-mode wireless telephone during an idle telephone state enables the dual-mode wireless telephone to register with the first wireless communication system when a call is not in progress, minimizing the necessity for extensive signaling normally encountered when attempting to transfer the dual-mode wireless telephone from the digital wireless communication system to the first wireless communication system during call set-up or handoff.

Still another aspect of the present invention provides a dual-mode wireless communication system. The system includes a first wireless telephone communication system configured for wireless telephone communications in prescribed coverage areas according to a first wireless protocol, and a digital wireless telephone communications system. The digital wireless telephone communications system is configured for communication with dual-mode wireless telephones registered in the prescribed coverage areas according to a digital wireless protocol. The digital wireless telephone communications system includes a mobile telephone switching office configured for outputting a rescan instruction to a selected group of the dual-mode wireless telephones in response to detection of a prescribed condition in the digital wireless telephone communications system. The rescan instruction instructs the selected group of the dual-mode wireless telephones to register with the first wireless telephone communications system. Moreover, the selection of the group of dual-mode wireless telephones enables the mobile telephone switching office to proactively transfer certain dual-mode wireless telephones to the first wireless telephone communications system, while maintaining other dual-mode wireless telephones within the digital wireless telephone communications system. In this manner, the invention may provide a priority-based transfer of dual-mode wireless telephones based on different traffic conditions encountered by the digital wireless telephone communications system. For example, a low-priority group of dual-mode telephones may be transferred during moderate traffic conditions, whereas a majority of dual-mode wireless telephones are transferred during severe traffic conditions, reserving the digital wireless telephone communications system for high-priority dual-mode wireless telephone subscribers, such as premium service subscribers or emergency/test subscribers.

Yet another aspect of the present invention includes a dual-mode wireless telephone. The dual-mode wireless telephone includes a digital wireless transceiver configured for detecting a digital communications system and in response establishing a digital communication link according to a digital wireless protocol. The telephone also includes a second wireless transceiver, and a controller. The second wireless transceiver is configured for selectively establishing a wireless communications link with a second communications system according to a second wireless protocol. The controller is configured for activating the second wireless transceiver, during an idle telephone state, to establish the wireless communications link in response to reception of a rescan command via the digital communication link. Unlike conventional dual-mode wireless telephones that maintain communications with the digital communications system until forced to perform an intersystem handoff, the dual-mode wireless telephone of the present invention is configured for activating the second wireless transceiver during an idle telephone state in response to reception of a rescan command via the digital communication link. Hence, the dual-mode wireless telephone provides a convenient arrangement for establishing registration with the second communication system before the dual-mode wireless telephone is next used by the subscriber.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
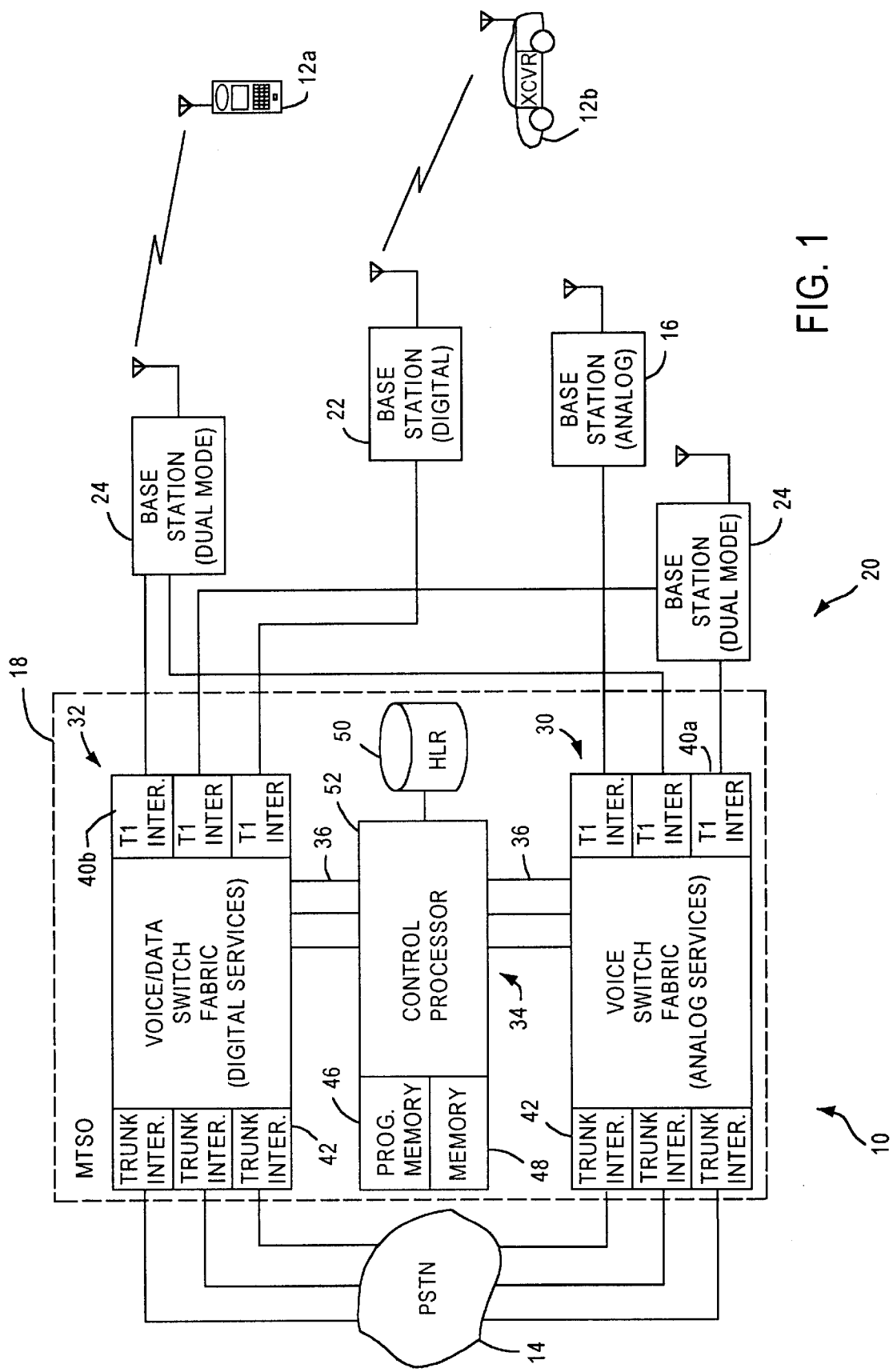
FIG. 1 is a block diagram illustrating a dual-mode wireless communication system according to an embodiment of the present invention.

FIG. 1 is a block diagram of a dual-mode wireless communications system according to an embodiment of the present invention. The dual-mode wireless communications system 10 is configured for wireless telephone and data communications between dual-mode wireless telephones 12 and the public switched telephone network (PSTN) 14. In particular, the dual-mode wireless telephone system 10 includes a first wireless telephone system that outputs analog telephone signals for transmission according to a first wireless protocol (e.g., AMPS). The first wireless telephone system is illustrated in FIG. 1 as a base station 16 that sends and receives voice and signaling traffic to a mobile telephone switching office (MTSO) 18 according to a prescribed analog protocol (e.g., AMPS).

The dual-mode wireless telephone system 10 also includes a digital wireless system 20, including a digital base station 22 having digital-only transmission protocol and dual-mode base stations 24 having circuitry for both wireless analog (e.g., AMPS) and digital (e.g., CDMA) communications. The base stations 22 and 24 are configured for transmission of digital wireless telephone signals in coverage regions (e.g., cells) overlying the coverage areas of the AMPS system 16 according to a digital wireless protocol, for example the CDMA protocol IS-95.

The dual-mode wireless telephones 12 are generally configured for first identifying the presence of a preferred wireless communication system, for example a CDMA (IS-95) wireless communication system. If the dual-mode telephone 12 is in a region that does not have a preferred technology (e.g., CDMA-based cellular coverage), the dual-mode telephone 12 then searches for the presence of the alternative technology (e.g., the AMPS system 16) and registers with the alternative technology upon acquisition. Dual-mode telephones provide the advantage of more comprehensive usage for the subscriber, since the dual-mode telephone 12 is usable in areas that do not include the technology preferred by the dual-mode wireless telephone 12. Hence, assuming one of the dual-mode wireless telephones 12 was located well within the coverage area of the AMPS-based system 16, the dual-mode telephone 12 would first attempt to detect the presence of the preferred digital wireless system 22 (e.g., CDMA); if the preferred digital technology in base stations 22 or 24 is not available, the dual-mode telephone 12 would then register with the AMPS system 10 according to the alternative technology circuitry in the dual-mode telephone 46.

A problem arises when the dual-mode telephones 12 attempt to initiate a telephone call using the preferred CDMA system when it may not be entirely favorable to use the CDMA system in the base stations 22 or 24. For example, conditions may arise due to transmission difficulties, for example system loading or traffic conditions, where it may be preferable that the dual mode telephones 12 initiate a new telephone call on the AMPS system 16 that is less preferred by the dual-mode telephones 46. However, current dual-mode telephones are autonomous in selecting a preferred technology (e.g., the CDMA system 20) over a less preferred system, (e.g., the AMPS system 16). Hence, there previously has been no way to control selection of the different available wireless telephone system, without redirecting the dual-mode telephone 12 during a call setup (i.e., reinitiation on the AMPS system 16) or during a call in progress (i.e., hard handoff or intersystem handoff). Such redirecting creates substantial delays during call setup, as well as a substantial risk of dropped calls during handoff.

According to the present invention, the digital wireless system 20 selectively controls the selection of a wireless telephone system by the dual-mode wireless telephones 12. In particular, the digital wireless system 20 outputs a control command, also referred to as a rescan command, to selected dual-mode wireless telephones (e.g., wireless telephone 12a), instructing the selected dual-mode telephones to register with the alternative wireless communications system (e.g., the AMPS system 16). As described below, the digital wireless telephone system 20 outputs the control command based on detection of a prescribed traffic condition in the digital wireless communications system, for example a blockage factor in a base station 22 or within the MTSO 18 that effects the overall capacity of the digital wireless communications system 20.

Hence, the digital wireless communications system 20, upon detecting a prescribed traffic condition, may proactively output the control command to selectively limit access by dual-mode digital telephones to selected high-priority dual-mode wireless telephone subscribers. In addition, the dual-mode wireless telephone 12 initiates the rescan to the alternative communications system in response to reception of the rescan command, enabling the dual-mode telephone 12 to register with the alternative system while in an idle state.

Hence, the CDMA system 20 controls selected dual-mode digital telephones 12 by sending a rescan command in response to detected traffic conditions, enabling the selected dual-mode digital telephones 12, while in an idle state, to register with the alternative analog system. The registration of the dual-mode digital telephones 12 while in an idle state resolves potential overload conditions in the digital wireless communications system upon detection of the prescribed traffic conditions, while minimizing delays in call setup and call signaling by causing registration of the dual-mode wireless telephone before user initiates a telephone call.

As shown in FIG. 1, the MTSO 18 includes a switching subsystem 30 for analog telephone services via the wireless AMPS system, a switching subsystem 32 for digital telephone services via the wireless CDMA system, and a control subsystem 34. The control subsystem 34 communicates with the switching subsystems 30 and 32 using data links 36, for example Ethernet (IEEE 802.3) data links. The switching subsystems 30 and 32 establish connections between the public switched telephone network (PTSN) 14 and mobile telephones via the AMPS-based wireless system 16 and the digital-based system 22, respectively. The switching subsystems 30 and 32 use well known switching techniques in establishing the voice connections to the wireless telephones. Exemplary manufacturers of MTSO switching units 30 and 32 include Lucent, Ericsson, Motorola, Hughes Network Systems, and Northern Telecom.

Each switching subsystem 30 and 32 includes a plurality of T1 interfaces 40 for supplying traffic and signaling data to the respective base stations. For example, the AMPS base station 16 transfers voice and signaling traffic between the switching subsystem 30 via a T1 interface 40a, whereas the digital base station 22 transfers voice and signaling data between the switching subsystem 32 via T1 interface 40b. As shown in FIG. 1, dual-mode base stations 24 send and receive voice and data traffic to switching subsystem 30 and/or 32 depending on whether the corresponding mobile station 12 is communicating according to digital mode or analog mode. Each switch subsystem 30 also includes a trunk interface 42 for termination of trunk lines with the PSTN 14.

The MTSO 18 includes a central processor subsystem 34 that controls all central office type functions, such as switching, networking, call processing, call statistics, and billing for the dual-mode wireless network 10. The control processor subsystem 24 also controls soft and hard handoff decisions, routing of signaling and voice traffic to and from the PSTN 14, etc. The control processor subsystem 34 includes program memory 46 for storing switching routines, a separate memory 48 for call processing and the like, and a subscriber profile register 50, also referred to as a home location register (HLR).

As recognized in the art, the HLR 50 includes subscriber profile information for each of the registered subscribers of the dual-mode wireless telephones 12. The HLR 50 stores subscriber profile information including the subscriber telephone number, the mobile identifier number of the dual-mode wireless telephone 12, etc. for each subscriber registered with the dual-mode system 10. The HLR 50 also stores, for each dual-mode wireless telephone 12, subscriber priority information that specifies a priority class for the corresponding dual-mode mobile telephone 12. In particular, the registered dual-mode digital telephones are assigned a priority class, depending on a selected subscription service (e.g., economy, basic, premium, etc.) and/or subscriber type (e.g., private, business, emergency response personnel, etc.). As described below, the control processor 52, upon detecting a traffic condition, may determine that a selected group of the dual-mode wireless telephones 12 should be redirected from the digital wireless communication system 20 to the AMPS-based system 16 to reduce loading on the digital wireless system 20.

Each priority class may also have an associated time interval that specifies the minimum time interval (i.e., deferral interval) before a dual-mode telephone 12 from the selected group can establish another wireless link with the digital communications system 20. Accordingly, the control processor 52 may establish a table in the HLR 50 that identifies a group of the dual-mode telephones 12 based on the corresponding priority class, enabling the control processor 52 to successively reassign different priority classes of mobile telephones for respective deferral intervals based on the detected traffic conditions. A similar subscriber profile may be established for roaming subscribers in a visitor location register (VLR) (not shown).

Hence, the control processor 52, upon detecting a prescribed traffic condition, may output via a digital wireless signaling channel a control command (i.e., a rescan command) to a first group of dual-mode wireless telephones 12 corresponding to a minimum priority class that specifies a minimum time interval before the selected group can establish another wireless link (i.e., transmit on the reverse link) in the digital communications system (e.g., 20 minutes). If the control processor 52 determines another traffic condition indicating more substantial overload conditions are present in the digital wireless communication system 20, the control processor 52 may output another control command to a second group of wireless telephones having a higher priority class that specifies another deferral interval (e.g., 10 minutes). Successive rescan commands may be sent to other groups having higher priority classes having successively smaller time intervals, enabling the control processor 52 to transfer more dual-mode telephones to the alternative AMPS system depending on the severity of the detected traffic conditions.

Figure 2:
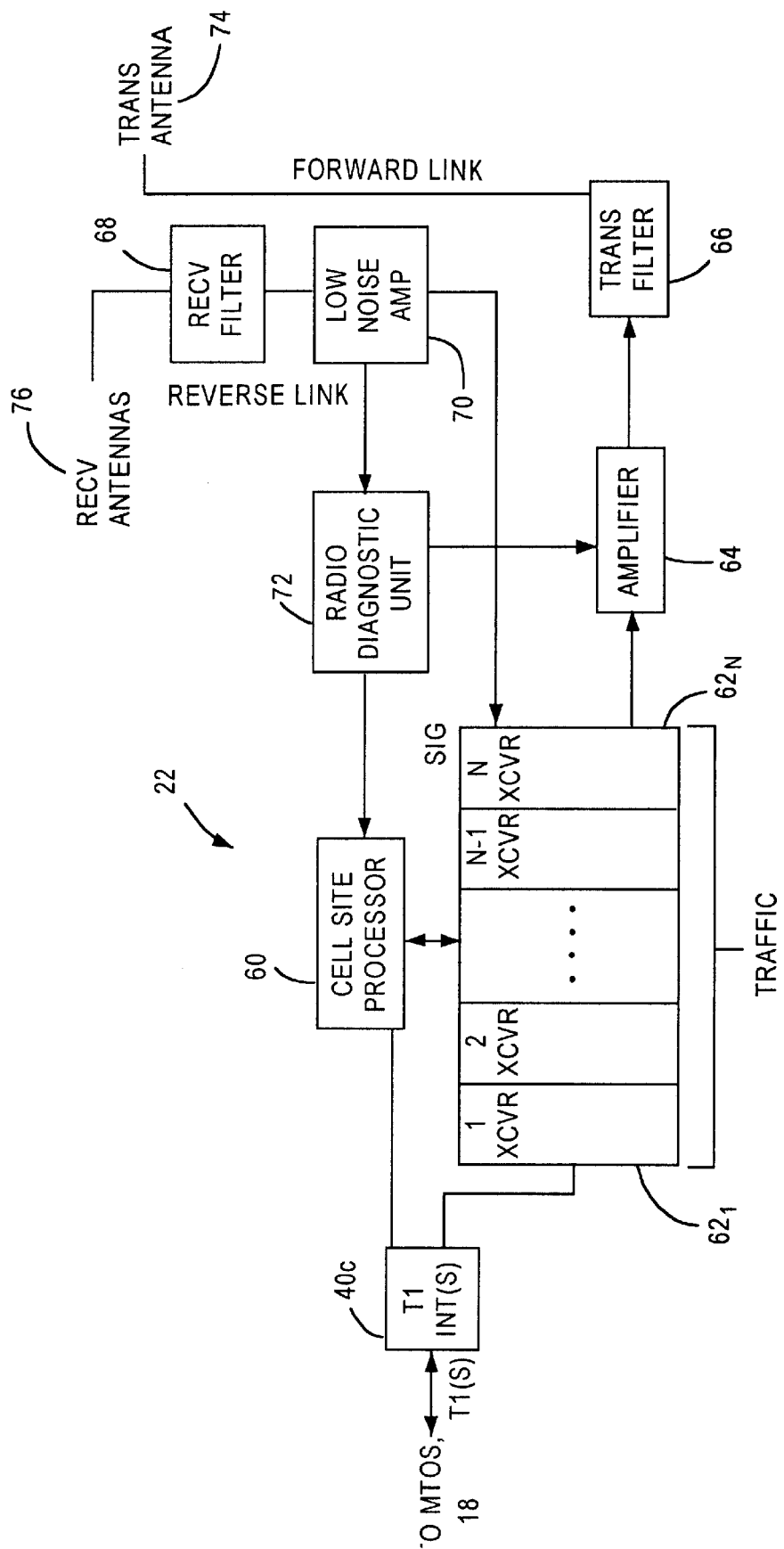
FIG. 2 is a block diagram illustrating in detail the digital base station of FIG. 1.

FIG. 2 is a block diagram illustrating the digital base station 22 of FIG. 1. The base station 22 includes a T1 interface 40c for terminating voice and signaling traffic from the corresponding T1 interface 40b in the MTSO 18. Although only 1 T1 interface is shown in FIG. 2, the base station 22 may be implemented using multiple T1 interfaces for multiple T1 links.

The digital base station 22 also includes a cell site processor 60, a plurality of transceiver channel cards 62, a low noise transmit amplifier 64, and a transmit filter 66 for forward link signals. The base station 22 also includes a receive filter 68 for filtering received wireless signals on the reverse link, a low noise receive amplifier 70, and a radio diagnostic unit 72. These components of the digital base station 22 are also found in the dual-mode base stations of FIG. 1.

The cell site processor 60 manages the overall operations of the base station 22. In particular, the cell site processor 60 assigns voice traffic to one of the transceiver channel cards $62_1$ to $62_{N-1}$ allocated for voice traffic. The cell site processor 60 also controls the routing of signaling data to a transceiver channel card $62_N$ designated for transmitting and receiving signaling data to the dual-mode wireless telephones within the corresponding cell propagation region of the cell site 22. The cell site processor 60 also supplies the appropriate code sequences to the transceiver cards 62. The transceiver channel cards 62 use the code sequences to modulate the supplied information (voice-data traffic and/or signaling data) into a spread spectrum signal having a unique code sequence.

Each transceiver card 62 is configured for generating a CDMA modulated signal for an assigned channel as specified by the cell site processor 60. The CDMA modulated signals are output to the amplifier 64, which amplifies the CDMA modulated signals to a prescribed transmit power level as specified by the transceiver channel cards 62. The amplified transmit signals are then filtered by the transmit filter 66, and output as the forward link channels to the air interface via a transmit antenna 74.

On the reverse link from the mobile 12 to the base station 22, the CDMA modulated signals are received by receive antennas-76 and filtered by a receive filter 68. The filtered signals are then amplified by a low noise amplifier 70, and supplied to the transceiver channel cards 62 for demodulation and recovery of the data transmitted by the dual-mode wireless telephone 12.

According to the preferred embodiment, the cell site transceivers 62 operate according to CDMA protocol IS-95. In particular, CDMA systems have been standardized according to TIA/ELA/IS-95A ("MOBILE STATION-BASE STATION COMPATIBILITY STANDARD FOR DUAL MODE WIDEBAND SPREAD SPECTRUM CELLULAR SYSTEM"—1995), by the Telecommunications Industry Association ("TIA"), the disclosure of which is incorporated in its entirety herein by reference.

With CDMA, each transmitted signal comprises a different pseudorandom binary sequence, also referred to as a pseudonoise (PN) sequence, that modulates a carrier signal, spreading the spectrum of the waveform. Thus, since each CDMA subscriber unit 12 is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system. CDMA interference therefore can be controlled, with the goal of increasing system capacity, on the basis of the reduction in signal-to-noise ratio caused by other users within the cellular CDMA system. Thus, a goal in any CDMA system is to limit the power output of transmitters in order to minimize the cumulative system noise caused by the other users in the CDMA system.

As recognized in the art, the wireless CDMA system 20 may be implemented as a cellular-type system, or a PCS-type system for Personal Communication Services (PCS). A proposed standard for a CDMA PCS system has been submitted by the Joint Technical Committee of the TIA, entitled PN-3384, "PERSONAL STATION-BASE STATION COMPATIBILITY REQUIREMENTS FOR 1.8 TO 2.0 GHz CODE DIVISION MULTIPLE ACCESS (CDMA) PERSONAL COMMUNICATIONS SYSTEMS", Nov. 3, 1994, the disclosure of which is incorporated herein by reference. The PCS proposed standard PN-3384 specifies enhanced services including transmission rates up to 14.4 kbps for enhanced speech quality, full data services at rates up to about 13 kbps, and simultaneous transmission of voice and data. The CDMA PCS system is adapted to operate in any of the licensed PCS frequency allocations from the FCC, currently assigned at 1930–1990 MHz band for the forward CDMA channel (base station to subscriber), and 1850–1910 MHz for the reverse CDMA channel (subscriber to base station).

The forward CDMA channel signals for each sector include sixty four (64) code channels generated by the channel elements 62. Each channel element 62 may handle one or more code channels. Certain code channels are assigned to different logic channels. For example, code channel 0 is used as a pilot channel, code channels 1–7 are used for either paging channels or traffic channels, and code channel 32 is used as a sync channel or a traffic channel. The remaining code channels are traffic channels. The paging channel, which supports a fixed data rate at 9600, 4800, or 2400 bps, is used for transmission of either control information or pages from the base station to the mobile station. Each paging channel slot has a 200 millisecond interval.

The CDMA circuitry in the dual-mode telephone 12, upon initializing for operation in a CDMA system, acquires the pilot channel of the cell site, and attempts to obtain system configuration and timing information for the CDMA cell site from the sync channel. In particular, the sync channel is used by the CDMA circuitry in the dual-mode telephone handsets 46 to acquire initial time synchronization data, transmitted as a complex direct sequence spread spectrum signal consisting of encoded data modulated with the short PN sequence and Walsh function 32. A sync channel is required on the primary and secondary CDMA RF channels to provide the digital CDMA circuitry in the dual-mode wireless telephone 46 with the basic timing information when the mobile 46 first acquires the base stations. The CDMA circuitry will periodically search for the sync channel, for example every 5–10 minutes. Note that sync channels are not required on the remaining CDMA RF channels.

The mobile telephone 12, upon initializing for operation in a CDMA system, acquires the pilot channel of the cell site base station 22, obtains system configuration and timing information for CDMA system, and begins monitoring the CDMA paging channels. In particular, the dual-mode digital telephone 12 may perform paging channel monitoring procedures while in an idle state. The mobile station 12 may operate in a slotted mode, where only selected slots (e.g., one or two slots per slot cycle) are monitored on the paging channel. Alternatively, the mobile station 12 may monitor all paging and control channels if operating in a non-slotted mode. In either case, the mobile station 12, monitors the paging and control channels for commands, and transmits an acknowledgment on a reverse link channel upon receiving any message that is addressed to the mobile station 12.

As described below, the cell site processor 60 monitors traffic conditions within the base station 22, and reports to the control processor 34 of the MTSO 18 if a traffic condition is detected in the base station 22. For example, the cell site processor 60 monitors for base station blockage factors, including a failure in (or detected by) the T1 interface, or some other hardware component. In addition, the cell site processor 60 monitors the radio diagnostic unit 72 to determine the presence of any radio link blockages. In particular, the radio diagnostic unit 72 measures the signal energy in the amplifiers 64 and 72, and as such measures the loading and/or interference on the radio spectrum. The cell site processor 60 thus uses the radio diagnostic unit 72 to detect an airlink interference overload or a airlink capacity overload. The cell site processor 60 also monitors the number of users that are assigned to the channel cards 62 at any point in time. If the cell site processor 60 detects a blockage problem that may be a potential traffic or overload condition, the cell site processor 60 reports the blockage factor, along with any other detected base station characteristic relevant to traffic management, to the MTSO 18. As described below, the cell site processor 60 is also configured for generating a rescan command to a selected dual-mode wireless telephone 12 based on commands received from the MTSO 18.

Figure 3:
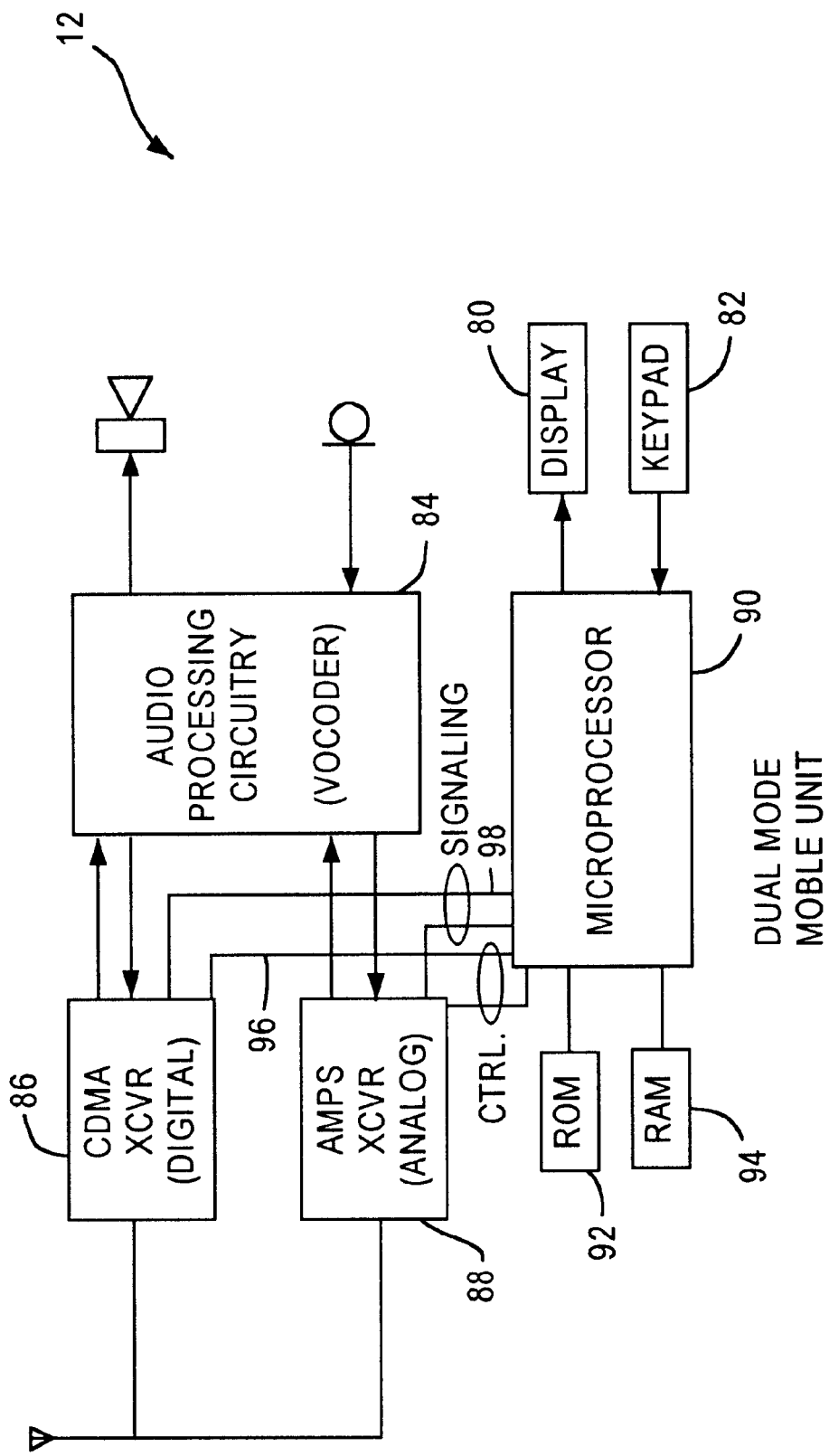
FIG. 3 is a block diagram illustrating the dual mode wireless telephone of FIG. 1.

FIG. 3 is a block diagram illustrating the dual-mode digital telephone 12 according to an embodiment of the present invention. As shown in FIG. 3, the dual-mode digital telephone 12 includes a display 80 for displaying various messages to the user, for example whether the user is registered with the CDMA network or the alternative AMPS network. The digital telephone 12 also includes a keypad 82 for dialing digits and generating selection inputs keyed by the user based on the displayed menu, audio processing circuitry 84 that includes a vocoder, a CDMA transceiver 86, an analog transceiver 88, and a microprocessor 90. The mobile unit 12 also includes a read only memory 92 and/or a random access memory 94 for storing various software routines and mobile configuration settings, such as mobile identification number, etc. The non-volatile random access memory 94 stores various software routines such as device driver software, call processing software, plus telephone numbers accessible by the user via the keypad 82.

The dual-mode digital telephone 12 has various states based on interactions by the user and commands received by the dual-mode wireless telephone 12 from either a digital network or an analog network. For example, the dual-mode wireless telephone 12 will initially will be in a standby mode, for example where the transceivers 86 and 88 are inactive. Upon depressing a power key on the keypad 82, the microprocessor 90 enters an initialization state, where the microprocessor 90 enables the CDMA transceiver 86 to search for a digital communications system according to a digital wireless protocol, for example IS-95. If the CDMA transceiver 86 detects a digital communications link according to the prescribed protocol, the CDMA transceiver 86 notifies the microprocessor 90 via the control path 96. The microprocessor 90 then can initiate a registration procedure with the detected digital communications system via the signaling path 98.

However, if the microprocessor 90 does not receive an indication from the CDMA transceiver 86 within the prescribed interval that a digital communication system has been detected, the microprocessor 90 instructs the AMPS transceiver 88 to attempt to establish a link with an AMPS-based wireless communication network. Assuming the AMPS transceiver establishes a wireless communications link with the AMPS base station 16, the microprocessor initiates a registration procedure to register with the AMPS-based station 16.

Figure 4:
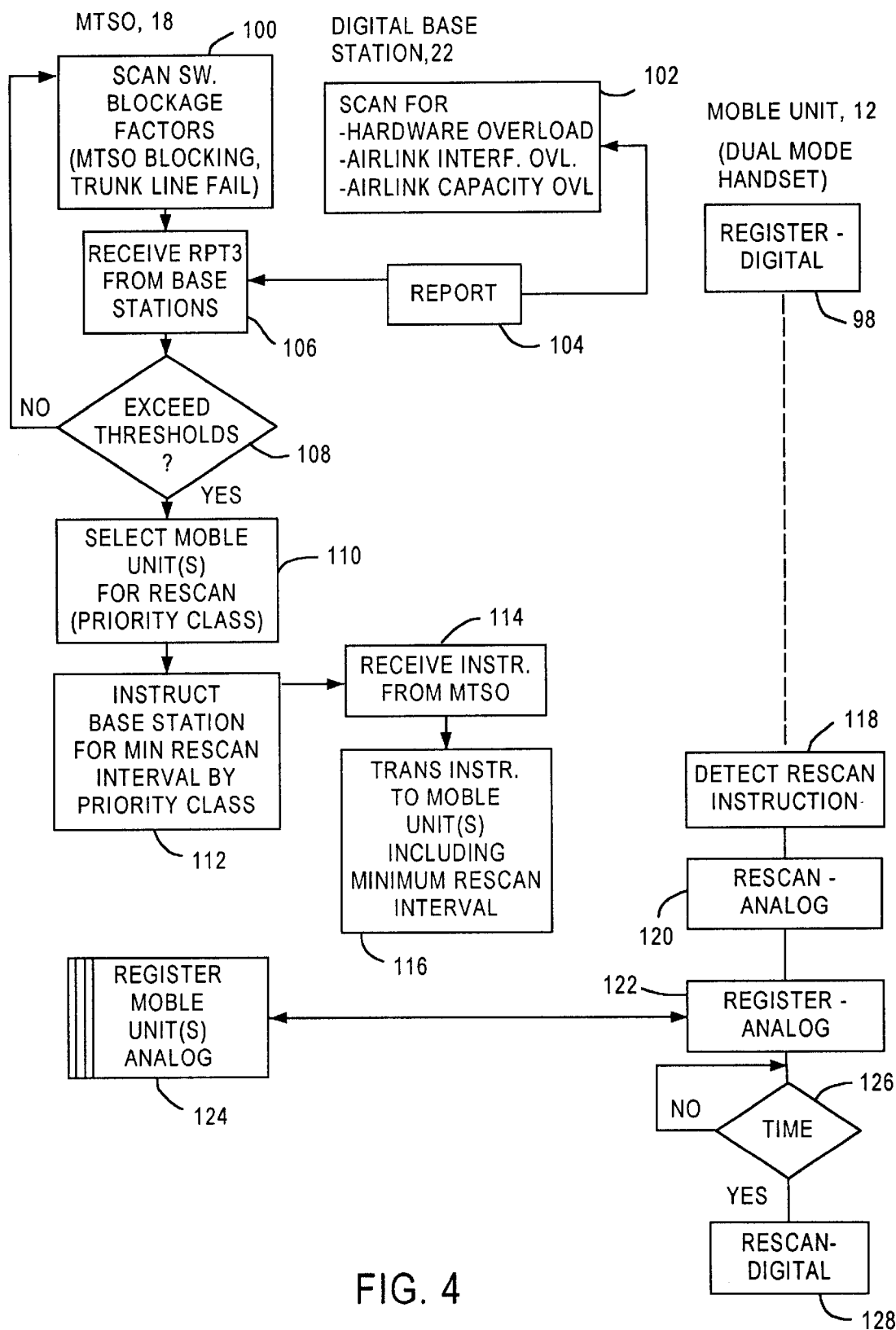
FIG. 4 is a flow diagram illustrating the method of controlling the dual-mode wireless telephone based on detected traffic conditions according to an embodiment of the present invention.

FIG. 4 is a diagram illustrating the method for selectively controlling a dual-mode wireless telephone to register with an alternative wireless communication system based upon a detected traffic condition according to an embodiment of the present invention. As shown in FIG. 4, the mobile unit 12 registers with the digital wireless system 20 while the MTSO 18 separately scans for possible blockage factors within the digital wireless communications system 20 in step 100. For example, the MTSO 18 may identify switch blockage factors such as a failure such as a blocking in the MTSO, or a trunk line failure on a trunk terminated by one of the trunk interfaces 42.

Each of the digital base stations 22 and dual-mode stations 24 of the digital wireless communications system 20 monitor base station operations to identify any possible blockage factors that may affect system capacity. For example, the cell site processor 60 in each base station 22 and 24 scans for any hardware overload, airlink interface overload, or airlink capacity overload in step 102, and reports any detected overload conditions in step 104 to the control processor 52 of the MTSO 18.

The MTSO 18 receives reports of all base station blockage factors from the respective base stations 22 and 24 in step 106. The MTSO processor compares the received blockage factors (from 104, 106) and any MTSO blockage factors (from 100) to prescribed thresholds in step 108. As recognized in the art, the thresholds in step 108 may be determined by traffic engineering. If the control processor 52 of the MTSO 18 determines that the scanned blockage factors do not exceed established traffic thresholds, the MTSO 18 returns to step 100 and continues to monitor blockage factors on a periodic basis.

If in step 108 the control processor 52 of MTSO 18 detects a prescribed traffic condition based on a blockage factor exceeding a threshold, the control processor 52 selects at least one dual-mode mobile unit 12 for rescan based on priority class in step 110. In particular, the control processor 52 accesses the above-described priority class table in the HLR 50 to identify the dual-mode digital wireless telephones 12 having the lowest priority class. Upon selecting a group of dual-mode wireless telephones that correspond to a priority class, the control processor 52 of the MTSO 18 instructs the appropriate base stations in communication with each dual-mode telephone 12 of the selected group to transmit a rescan control command in step 112. Each instruction will also include a prescribed time interval (i.e., deferred interval) that specifies the minimum time interval that the dual-mode telephone must be registered with the alternative communications system before attempting to establish another wireless link on a CDMA reverse link channel with the digital wireless communications system.

The digital base station 22 receives the control command from the MTSO 18 in step 114, and transmits the rescan control command to the selected mobile unit, including the minimum rescan interval, in step 116. The dual-mode digital wireless transceiver 12, having registered with the digital wireless communications system in step 98, receives the rescan control command via a digital wireless signaling link and decodes the received rescan instruction in step 118. The controller 90 in the dual-mode mobile unit 12 responds to the rescan command by activating the second AMPS wireless transceiver 88 during an idle telephone state (i.e., when a call is not in progress) in step 120, and registering in step 122 with the second wireless communications system (i.e., the analog base station 16). During the registration procedure the control processor 52 in the MTSO 18 updates the corresponding subscriber profile information stored in the home location register 50 to indicate that the mobile unit 12 is now registered on the analog system in step 124. Hence, any incoming calls from the PSTN 14 will be switched to the analog base station 16 via the switching subsystem 30 handling calls for the analog wireless communication. If the user attempts to make a call from the mobile unit 12, the mobile unit will initiate the call through the AMPS portion of the wireless network. If the rescan command is received by the dual-mode telephone while the CDMA transceiver 86 is in use for a call in progress, the processor 90 may defer steps 120 and 122 until the digital phone call is completed, eliminating the necessity for a hard handoff.

The microprocessor 90 maintains the registration with the alternative mobile communication system for the minimum rescan interval in step 126 before instructing the digital wireless transceiver 86 to attempt to establish another digital communication link on a CDMA reverse link channel with the digital base station 22 in step 128. In particular, the receiver circuitry of the CDMA transceiver 86 may continue to synchronize itself to the forward link CDMA channels, but the processor 90 will not let the transmitter circuitry of the CDMA transceiver 86 transmit any signals on a CDMA reverse link channel (e.g., reverse access channel or reverse traffic channel) during the minimum rescan interval. Hence, the dual-mode wireless telephone is controlled to remain on the alternative analog system for a prescribed minimum interval, enabling the control processor 52 in the MTSO 18 to cause groups of dual-mode digital telephone 12 to transfer to the analog-based system for the prescribed interval based on detected traffic conditions. After the prescribed time interval has expired, the CDMA transceiver 86 initiates reregistration on the CDMA reverse link channel in step 128.

According to the present invention, access to the digital cellular system is controlled by monitoring different blockage factors that may affect capacity in the digital cellular system. Control commands, also referred to as rescan commands, are selectively output to selected groups of dual-mode wireless telephones, instructing the selected group of dual-mode telephones to register with the second wireless communications system. This arrangement enables the digital wireless communications system to proactively limit access to the system where the dual-mode telephone may register with the alternative analog-based system while in an idle mode, minimizing delays that would otherwise occur during call setup or the risk of any hard handoff during a call in progress. If a call is actually in progress, the MTSO 18 may output two types of control commands, namely a first type that instructs the selected dual-mode wireless telephone to register with the second wireless communication system upon completion of the call in progress, or a second control command that forces the dual-mode wireless telephone to perform a hard handoff. As described above, the first type of control command would generally be preferred to minimize the occurrence of a dropped call during hard handoff.

Although the disclosed embodiment is described in terms of a primary wireless network as being IS-95 complaint CDMA and the alternative network being an AMPS-based analog system, it will be appreciated that other wireless technologies may be used in both instances, for example, North American TDMA (IS-41), or the European GSM protocol.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a dual-mode wireless communications system having a digital wireless communications system overlying a second wireless communications system, the method comprising:

detecting a prescribed traffic condition in the digital wireless communications system; and outputting a control command from the digital wireless communications system to at least one selected dual-mode wireless telephone, having registered with the digital wireless communications system, instructing the at least one selected dual-mode wireless telephone to register with the second wireless communications system based on the detected prescribed traffic condition if in an idle state.

2. The method of claim 1, wherein the step of detecting a prescribed traffic condition comprises detecting the prescribed traffic condition by a mobile telephone switching office.

3. The method of claim 2, wherein the outputting step comprises:

generating the control command in the mobile telephone switching office in response to the detection of the prescribed traffic condition; and transmitting the control command from a selected digital wireless base station in communication with the dual-mode wireless telephone.

4. The method of claim 3, wherein the transmitting step includes transmitting the control command on a prescribed signaling channel.

5. The method of claim 2, wherein the step of detecting a prescribed traffic condition further includes detecting a facilities failure within the digital wireless communications system.

6. The method of claim 5, wherein the step of detecting a prescribed traffic condition further includes identifying the facilities failure as at least one of a blocking in the mobile telephone switching office and a failure in a trunk line in communication with the mobile telephone switching office.

7. The method of claim 2, wherein the step of detecting a prescribed traffic condition further comprises:

detecting base station blockage factors by a base station transceiver of the digital wireless communications system;

reporting the base station blockage factors to the mobile telephone switching office; and determining the prescribed traffic condition in the mobile telephone switching office based on the reported base station blockage factors.

8. The method of claim 7, wherein the step of detecting base station blockage factors includes measuring at least one of an airlink interference overload and an airlink capacity overload by the base station transceiver on at least one of a forward link and reverse link.

9. The method of claim 7, wherein the step of detecting base station blockage factors includes detecting a hardware overload condition at the base station transceiver.

10. The method of claim 1, further comprising selecting the at least one selected dual-mode wireless telephone, from a plurality of dual-mode wireless telephones in communication with the digital wireless communications system, based on a corresponding prescribed service condition.

11. The method of claim 10, wherein the outputting step includes specifying a minimum time interval for registration with the second wireless communications system based on the corresponding prescribed service condition.

12. A method in a wireless communication system including dual-mode wireless telephones and a dual-mode communications system, having a first wireless communications system and a digital wireless communications system overlying the first wireless communication system, the method comprising:

establishing a first registration, between one of the dual-mode wireless telephones and the digital wireless communications system according to a prescribed digital wireless protocol;

detecting a prescribed traffic condition in the digital wireless communications system;

transmitting a control command through the digital wireless communications system to the one dual-mode wireless telephone, based on the detected prescribed traffic condition;

receiving the control command in the one dual-mode wireless telephone, while the one dual-mode wireless telephone is idle; and in response to receiving the control command while idle, establishing a second registration, between the one dual-mode wireless telephone and the first wireless communications system according to a prescribed wireless protocol, and dropping the first wireless registration.

13. The method of claim 12, wherein the step of detecting a prescribed traffic condition comprises detecting the prescribed traffic condition by a mobile telephone switching office.

14. The method of claim 13, wherein the step of detecting a prescribed traffic condition further includes detecting a facilities failure within the digital wireless communications system.

15. The method of claim 13, wherein the step of detecting a prescribed traffic condition further comprises:

detecting base station blockage factors by a base station transceiver of the digital wireless communications system;

reporting the base station blockage factors to the mobile telephone switching office; and determining the prescribed traffic condition in the mobile telephone switching office based on the reported base station blockage factors.

16. The method of claim 12, further comprising:

selecting the one dual-mode wireless telephone, from a plurality of dual-mode wireless telephones in communication with the digital wireless communications system, based on a corresponding prescribed service condition; and generating the control command by including a minimum rescan interval specifying a minimum time interval for registering with the second wireless communications system, based on the prescribed service condition.

17. The method of claim 16, further comprising maintaining, by the one dual-mode wireless telephone, the second wireless registration for the minimum time interval before attempting to establish another registration with the digital wireless communications system.

18. A dual-mode wireless communications system comprising:

a first wireless telephone communications system configured for wireless telephone communications in prescribed coverage areas according to a first wireless protocol; and a digital wireless telephone communications system configured for communication with dual mode wireless telephones registered in the prescribed coverage areas according to a digital wireless protocol, the digital wireless telephone communications system including a mobile telephone switching office configured for outputting a rescan instruction to a selected group of registered dual mode wireless telephones, instructing idle ones of the selected group to register with the first wireless telephone communications system, in response to a detection of a prescribed traffic condition in the digital wireless telephone communications system.

19. The system of claim 18, wherein the mobile telephone switching office includes a subscriber profile register for storing subscriber priority information for each of the dual mode telephones, the mobile telephone switching office determining the selected group based on the subscriber priority information identifying a corresponding priority class.

20. The system of claim 19, wherein the mobile telephone switching office specifies in the rescan instruction a minimum time interval before the selected group can establish another wireless link with the digital communications system, based on the priority class for the selected group.

21. The system of claim 18, wherein the mobile telephone switching office detects the prescribed traffic condition as a facilities failure within the digital wireless communications system.

22. The system of claim 21, wherein the mobile telephone switching office detects the facilities failure as one of a blocking in the mobile telephone switching office and a failure in a trunk line in communication with the mobile telephone switching office.

23. The system of claim 18, wherein the digital wireless telephone communications system further includes a base station transceiver for communication with at least a group of the dual-mode wireless telephones on an airlink, the base station transceiver detecting the prescribed traffic condition as one or more detected base station blockage factors, including at least one of an airlink interference overload and an airlink capacity overload, and reporting each detected base station blockage factor to the mobile telephone switching office.

24. A dual-mode wireless telephone comprising:

a digital wireless transceiver configured for detecting a digital communications system and in response registering for digital communication therewith according to a digital wireless protocol;

a second wireless transceiver configured for selectively registering for wireless communications with a second communications system according to a second wireless protocol; and a controller configured for controlling the digital wireless transceiver to terminate a registration with the digital communications system and activating the second wireless transceiver to initiate a registration with the wireless communications system in response to reception of a rescan command via the digital communication system during an idle telephone state.

25. The dual-mode wireless telephone of claim 24, wherein the controller controls the digital wireless transceiver to establish a new registration with the digital communications system a prescribed time interval after establishment of the wireless communications link in response to the reception of the rescan command.

26. The dual-mode wireless telephone of claim 25, wherein the controller obtains the prescribed time interval from the rescan command.

27. In a dual-mode wireless communications system having a digital first wireless communications system overlying a second wireless communications system, a traffic off-load method comprising:

detecting a prescribed traffic condition in the digital first wireless communications system;

in response to the detection of the prescribed traffic condition, selecting a dual-mode wireless telephone that has registered with the digital first wireless communications system; and transmitting a control command from the digital wireless communications system instructing the selected dual-mode wireless telephone to register with the second wireless communications system when idle.

* * * * *